United States Patent
Tratta et al.

(10) Patent No.: US 11,077,897 B2
(45) Date of Patent: *Aug. 3, 2021

(54) TRACK SYSTEM FOR TRACTION OF A VEHICLE

(71) Applicant: Camso Manufacturing Italy S.R.L., Remedello (IT)

(72) Inventors: Giuseppe Tratta, Remedello (IT); Riccardo Canossa, Revere (IT)

(73) Assignee: Camso Manufacturing Italy S.R.L., Remedello (IT)

( * ) Notice: Subject to any disclaimer, the term of this patent is extended or adjusted under 35 U.S.C. 154(b) by 357 days.

This patent is subject to a terminal disclaimer.

(21) Appl. No.: 15/997,058

(22) Filed: Jun. 4, 2018

(65) Prior Publication Data

US 2019/0002043 A1    Jan. 3, 2019

Related U.S. Application Data

(63) Continuation of application No. 14/921,735, filed on Oct. 23, 2015, now Pat. No. 9,988,108.

(51) Int. Cl.
*B62D 55/084* (2006.01)
*B62D 55/04* (2006.01)
(Continued)

(52) U.S. Cl.
CPC ........... *B62D 55/084* (2013.01); *A01D 67/00* (2013.01); *B62D 55/04* (2013.01); *B62D 55/08* (2013.01);
(Continued)

(58) Field of Classification Search
CPC ........ B62D 55/12; B62D 55/04; B62D 55/10; B62D 55/125; B62D 55/13; B62D 55/08; B62D 55/084
See application file for complete search history.

(56) References Cited

U.S. PATENT DOCUMENTS 1,439,236 A    12/1922  Harris
1,636,828 A    7/1927   Neighbour
(Continued)

FOREIGN PATENT DOCUMENTS

CN    202080289    12/2011
EP    0 680 869    11/1995
(Continued)

OTHER PUBLICATIONS

International Search dated Feb. 10, 2011 in connection with International Application No. PCT/US2010/051166—4 pages.
(Continued)

*Primary Examiner* — Jason R Bellinger
(74) *Attorney, Agent, or Firm* — Fish & Richardson P.C.

(57) ABSTRACT

A track system for traction of a vehicle that is connectable to an axle of the vehicle and includes a track and a track-engaging assembly for driving and guiding the track around the track-engaging assembly. The track-engaging assembly includes a drive wheel for driving the track, idler wheels for contacting a bottom run of the track, and a bogie carrying the idler wheels. The track system includes a transmission for transmitting power from the axle of the vehicle to the drive wheel such that a rotational speed of the drive wheel is different from a rotational speed of the axle of the vehicle. The track system includes a connector disposed between the transmission and the bogie such that the bogie is movable (e.g., pivotable) relative to the transmission. The connector may be disposed below an output shaft of the transmission.

39 Claims, 11 Drawing Sheets

(51) Int. Cl.
　　　*B62D 55/08*　　(2006.01)
　　　*B62D 55/10*　　(2006.01)
　　　*A01D 67/00*　　(2006.01)
　　　*B62D 55/125*　　(2006.01)
　　　*B62D 55/24*　　(2006.01)
　　　*B62D 55/02*　　(2006.01)
　　　*A01D 41/12*　　(2006.01)
　　　*B62D 55/06*　　(2006.01)
　　　*B62D 55/065*　　(2006.01)

(52) U.S. Cl.
　　CPC .......... *B62D 55/10* (2013.01); *B62D 55/125* (2013.01); *B62D 55/24* (2013.01); *A01D 41/12* (2013.01); *B62D 55/02* (2013.01); *B62D 55/06* (2013.01); *B62D 55/065* (2013.01); *B62D 55/0655* (2013.01)

(56) References Cited

U.S. PATENT DOCUMENTS

| | | | |
|---|---|---|---|
| 1,665,470 | A | 4/1928 | Norelius |
| 2,453,209 | A | 11/1948 | Dwight |
| 3,216,520 | A | 11/1965 | Blonsky |
| 3,435,908 | A | 4/1969 | Sunderlin et al. |
| 3,539,170 | A | 11/1970 | Hamel |
| 3,583,509 | A | 6/1971 | Stachnik |
| 3,595,332 | A | 7/1971 | Sanstrom |
| 3,696,878 | A | 10/1972 | Nelson |
| 3,774,708 | A | 11/1973 | Purcell et al. |
| 3,826,325 | A | 7/1974 | Purcell et al. |
| 3,828,873 | A | 8/1974 | Oestmann |
| 3,841,424 | A | 10/1974 | Purcell et al. |
| 3,946,822 | A | 3/1976 | Dohse et al. |
| 4,069,883 | A | 1/1978 | Cousineau |
| 4,161,227 | A | 7/1979 | Inui et al. |
| 4,874,052 | A | 10/1989 | Purcell et al. |
| 4,881,609 | A | 11/1989 | Purcell et al. |
| 5,240,084 | A | 8/1993 | Christianson |
| 5,273,126 | A | 12/1993 | Reed et al. |
| 5,343,960 | A | 9/1994 | Gilbert |
| 5,361,860 | A | 11/1994 | Smith et al. |
| 5,373,909 | A | 12/1994 | Dow |
| 5,452,949 | A | 9/1995 | Kelderman |
| 5,566,773 | A | 10/1996 | Gersmann |
| 5,829,848 | A | 11/1998 | Kelderman |
| 5,842,757 | A | 12/1998 | Kelderman |
| 5,924,503 | A | 7/1999 | Lykken |
| RE36,284 | E | 8/1999 | Kelderman |
| D425,526 | S | 5/2000 | Juncker et al. |
| 6,062,661 | A | 5/2000 | Juncker et al. |
| 6,062,662 | A | 5/2000 | Witt |
| 6,068,353 | A | 5/2000 | Juncker et al. |
| 6,074,024 | A | 6/2000 | Juncker |
| 6,074,025 | A | 6/2000 | Juncker et al. |
| 6,116,362 | A | 9/2000 | Schubert et al. |
| 6,164,399 | A | 12/2000 | Bays |
| 6,176,334 | B1 | 1/2001 | Lorenzen |
| 6,318,484 | B2 | 11/2001 | Lykken et al. |
| 6,374,933 | B1 | 4/2002 | Ruppert et al. |
| 6,401,847 | B1 | 6/2002 | Lykken |
| 6,536,854 | B2 | 3/2003 | Juncker et al. |
| 6,543,861 | B1 | 4/2003 | Kahle et al. |
| 6,543,862 | B1 | 4/2003 | Kahle et al. |
| 6,557,953 | B1 | 5/2003 | Kahle et al. |
| 6,607,256 | B2 | 8/2003 | Yosida et al. |
| D488,171 | S | 4/2004 | Juncker et al. |
| 6,857,816 | B2 | 2/2005 | Saito et al. |
| 6,929,334 | B2 | 8/2005 | Verheye et al. |
| RE38,858 | E | 11/2005 | Grawey et al. |
| 7,077,216 | B2 | 7/2006 | Juncker |
| 7,156,185 | B2 | 1/2007 | Juncker |
| 7,222,924 | B2 | 5/2007 | Christianson |
| 7,255,184 | B2 | 8/2007 | Loegering et al. |
| 7,552,979 | B2 | 6/2009 | Christianson |
| 7,798,260 | B2 | 9/2010 | Albright |
| 9,505,454 | B1 | 11/2016 | Kautsch |
| 9,988,108 | B2 | 6/2018 | Tratta et al. |
| 10,112,663 | B1 | 10/2018 | Kautsch |
| 2001/0025732 | A1 | 10/2001 | Lykken et al. |
| 2003/0070862 | A1 | 4/2003 | Tartara |
| 2003/0127258 | A1 | 7/2003 | Lansberry |
| 2005/0035650 | A1 | 2/2005 | Toews |
| 2005/0035655 | A1 | 2/2005 | Beckstrom et al. |
| 2005/0077784 | A1 | 4/2005 | Dudzinski et al. |
| 2005/0200200 | A1 | 9/2005 | Fukushima |
| 2006/0113121 | A1 | 6/2006 | Radke et al. |
| 2006/0267405 | A1 | 11/2006 | Tucker |
| 2007/0102173 | A1 | 5/2007 | Juncker |
| 2007/0138866 | A1 | 6/2007 | Rosenboom |
| 2007/0261898 | A1 | 11/2007 | Bessette |
| 2008/0084111 | A1 | 4/2008 | Rainer |
| 2008/0156548 | A1 | 7/2008 | Mallette |
| 2009/0278403 | A1 | 11/2009 | Canossa |
| 2009/0308669 | A1 | 12/2009 | Vos et al. |
| 2009/0321151 | A1 | 12/2009 | Archambault et al. |
| 2010/0006353 | A1 | 1/2010 | Bernard et al. |
| 2010/0012399 | A1 | 1/2010 | Hansen |
| 2010/0060075 | A1 | 3/2010 | Hansen |
| 2010/0071969 | A1 | 3/2010 | Rainer |
| 2010/0108421 | A1 | 5/2010 | Zuchoski |
| 2010/0133019 | A1 | 6/2010 | Muemken |
| 2010/0139994 | A1 | 6/2010 | Hansen |
| 2011/0068620 | A1 | 3/2011 | Delisle |
| 2011/0155482 | A1 | 6/2011 | Courtemanche |
| 2012/0242142 | A1 | 9/2012 | Kautsch et al. |
| 2013/0187444 | A1 | 7/2013 | Hansen |
| 2015/0344087 | A1 | 12/2015 | De Boe |
| 2016/0039482 | A1 | 2/2016 | Lussier |
| 2017/0113742 | A1 | 4/2017 | Tratta et al. |
| 2017/0274946 | A1 | 9/2017 | Vik et al. |

FOREIGN PATENT DOCUMENTS

| | | |
|---|---|---|
| EP | 1 982 904 | 10/2008 |
| WO | WO2007101633 | 9/2007 |
| WO | WO2007101634 | 9/2007 |
| WO | WO2011041704 | 4/2011 |

OTHER PUBLICATIONS

Written Opinion dated Feb. 10, 2011 in connection with International Application No. PCT/US2010/051166—12 pages.

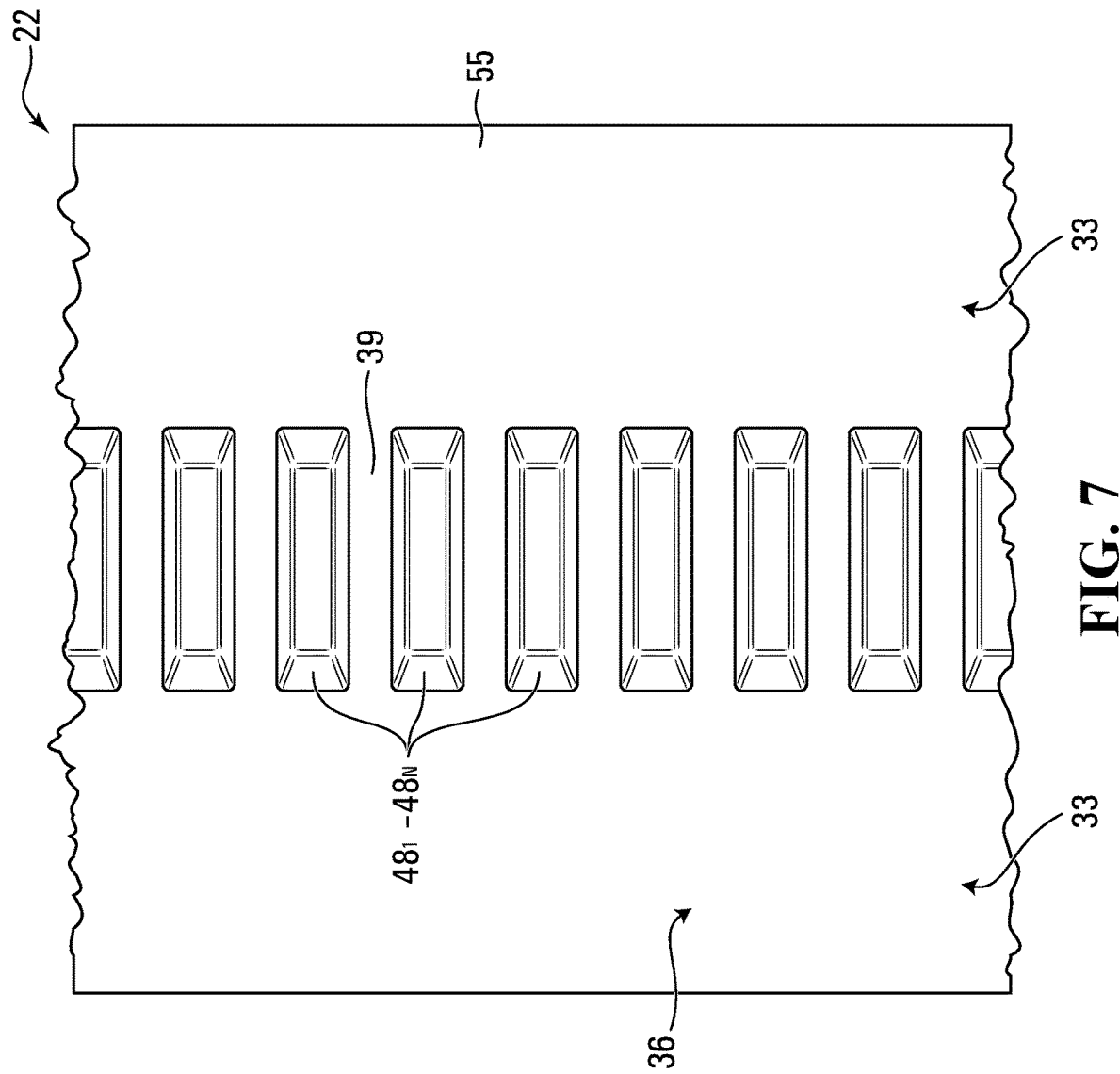

TRACK SYSTEM FOR TRACTION OF A VEHICLE

CROSS-REFERENCE TO RELATED APPLICATIONS

This application is a continuation application of and claims priority to U.S. application Ser. No. 14/921,735, filed on Oct. 23, 2015 and issued to U.S. Pat. No. 9,988,108 on Jun. 5, 2018, the entire disclosure of which is incorporated herein by reference.

FIELD

The invention relates generally to track systems for traction of vehicles (e.g., agricultural vehicles, industrial vehicles, etc.).

BACKGROUND

Certain off-road vehicles, such as agricultural vehicles (e.g., harvesters, combines, tractors, etc.), construction vehicles (e.g., loaders, bulldozers, excavators, etc.), forestry vehicles (e.g., feller-bunchers, tree chippers, knuckleboom loaders, etc.) and military vehicles (e.g., combat engineering vehicles (CEVs), etc.) to name a few, are used in agricultural fields, construction sites and other areas with a variety of ground surfaces which may be soft, slippery and/or uneven (e.g., soil, mud, sand, ice, snow, etc.) to perform various types of work.

Some vehicles ride on wheels with tires that propel them on the ground. As they are typically quite heavy and their weight is distributed over a relatively small ground area by their tires, these vehicles apply relatively high pressure on the ground. This high pressure tends to compact the ground on which the vehicles are supported and such ground compaction can be undesirable (e.g., compacted soil can discourage crop growth or otherwise adversely affect the area being compacted). Also, as the tires provide a relatively small contact surface with the ground, traction of these vehicles is often limited, particularly on wet grounds.

To address these drawbacks, some vehicles have been provided with track systems instead of wheels with tires. These track systems typically have elastomeric endless tracks which enhance floatation and traction of the vehicles on the ground. However, existing track systems tend to adversely affect other aspects of vehicle performance. For example, existing track systems may detrimentally affect speeds at which the vehicles can travel on the ground compared to when they are on wheels. Existing track systems may also sometimes affect ride quality.

For these and other reasons, there is a need to improve track systems for traction of off-road vehicles.

SUMMARY

According to an aspect of the invention, there is provided a track system for traction of a vehicle. The track system is connectable to an axle of the vehicle. The track system comprises a track and a track-engaging assembly for driving and guiding the track around the track-engaging assembly. The track comprises elastomeric material to flex around the track-engaging assembly. The track-engaging assembly comprises a drive wheel for driving the track, a plurality of idler wheels for contacting a bottom run of the track, and a bogie carrying the idler wheels. The track system comprises a transmission for transmitting power from the axle of the vehicle to the drive wheel such that a rotational speed of the drive wheel is different from a rotational speed of the axle of the vehicle. The track system comprises a connector disposed between the transmission and the bogie such that the bogie is movable relative to the transmission.

According to another aspect of the invention, there is provided a track system for traction of a vehicle. The track system is connectable to an axle of the vehicle. The track system comprises a track and a track-engaging assembly for driving and guiding the track around the track-engaging assembly. The track comprises elastomeric material to flex around the track-engaging assembly. The track-engaging assembly comprises a drive wheel for driving the track, a plurality of idler wheels for contacting a bottom run of the track, and a bogie carrying the idler wheels. The track system comprises a transmission for transmitting power from the axle of the vehicle to the drive wheel such that a rotational speed of the drive wheel is different from a rotational speed of the axle of the vehicle. The track system comprises a pivot disposed between the transmission and the bogie such that the bogie is pivotable relative to the transmission.

According to another aspect of the invention, there is provided a track system for traction of a vehicle. The track system is connectable to an axle of the vehicle. The track system comprises a track and a track-engaging assembly for driving and guiding the track around the track-engaging assembly. The track comprises elastomeric material to flex around the track-engaging assembly. The track-engaging assembly comprises a drive wheel for driving the track, a plurality of idler wheels for contacting a bottom run of the track, and a bogie carrying the idler wheels. The track system comprises a transmission for transmitting power from the axle of the vehicle to the drive wheel such that a rotational speed of the drive wheel is different from a rotational speed of the axle of the vehicle. The transmission comprises an output shaft connected to the drive wheel. The track system comprises a pivot disposed between the transmission and the bogie such that the bogie is pivotable relative to the transmission about a pivot axis below the output shaft of the transmission.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 7 shows an inside view of the track;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
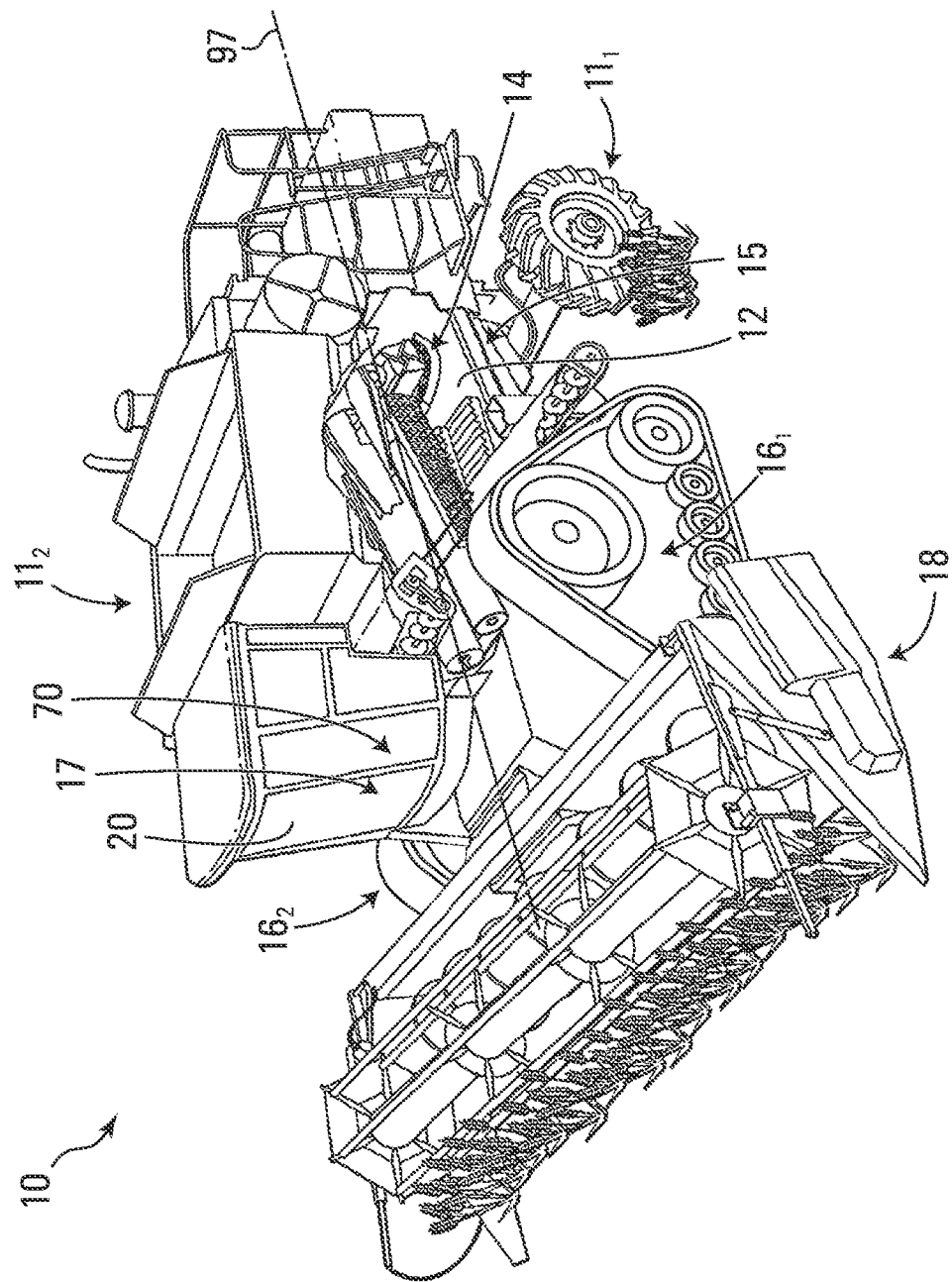
FIG. 1 shows an example of a vehicle comprising track systems in accordance with an embodiment of the invention.

FIG. 1 shows an example of a vehicle 10 in accordance with an embodiment of the invention. In this embodiment, the vehicle 10 is a heavy-duty work vehicle for performing agricultural work, construction or other industrial work, or military work. More particularly, in this embodiment, the vehicle 10 is an agricultural vehicle for performing agricultural work. More specifically, in this example, the agricultural vehicle 10 is a combine harvester. In other examples, the agricultural vehicle 10 may be a tractor, another type of harvester, or any other type of agricultural vehicle.

The agricultural vehicle 10 comprises a frame 12, a powertrain 15, a steering system 17, a plurality of track systems $16_1$, $16_2$, a plurality of ground-engaging wheels $11_1$, $11_2$, a work implement 18, and an operator cabin 20 that enable an operator to move the agricultural vehicle 10 on the ground.

The powertrain 15 is configured for generating motive power to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). In this example, the prime mover 14 is in a driving relationship with the track systems $16_1$, $16_2$. That is, the powertrain 15 transmits motive power generated by the prime mover 14 to the track systems $16_1$, $16_2$ in order to drive (i.e., impart motion to) the track systems $16_1$, $16_2$. Power derived from the prime mover 14 may also be transmitted to the ground-engaging wheels $11_1$, $11_2$. The powertrain 15 may transmit power from the prime mover 14 in any suitable way. For instance, in this embodiment, the powertrain 15 may comprise a transmission and/or a differential between the prime mover 14 and a final drive axle 56 for transmitting motive power from the prime mover 14 to the track systems $16_1$, $16_2$.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

Figure 2:
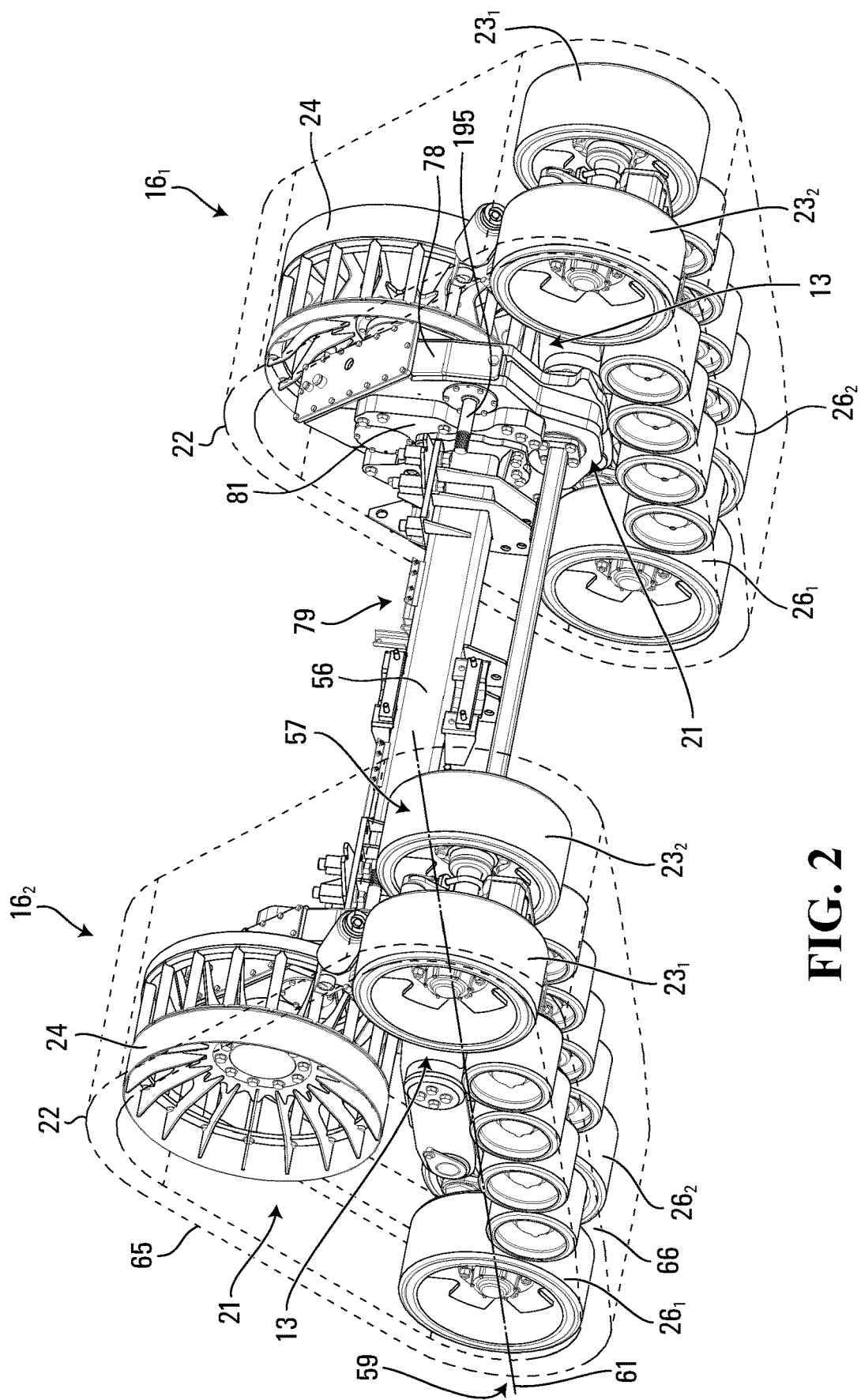
FIG. 2 shows the track systems connected to an axle of the vehicle.
Figure 3:
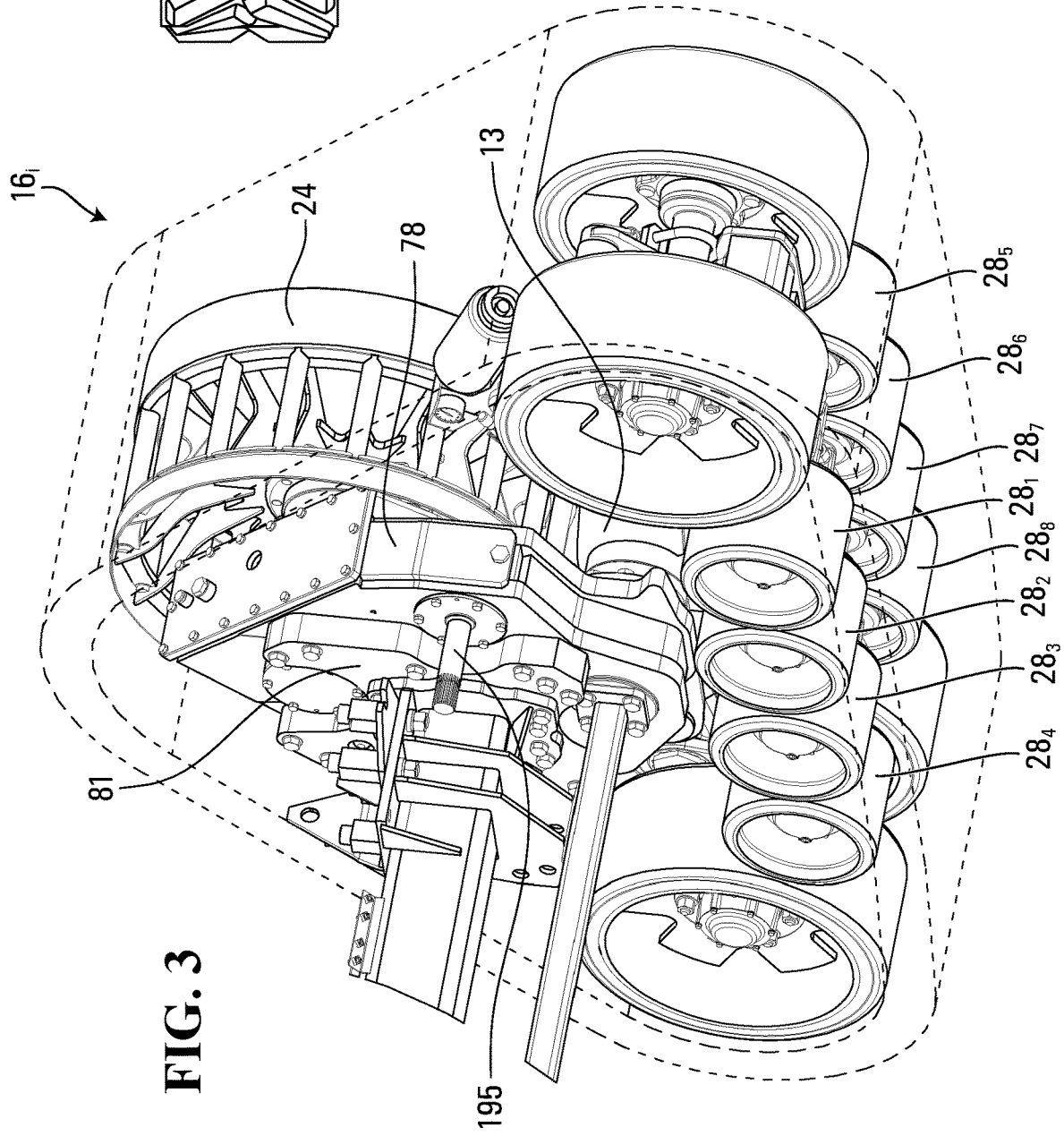
Figure 6:
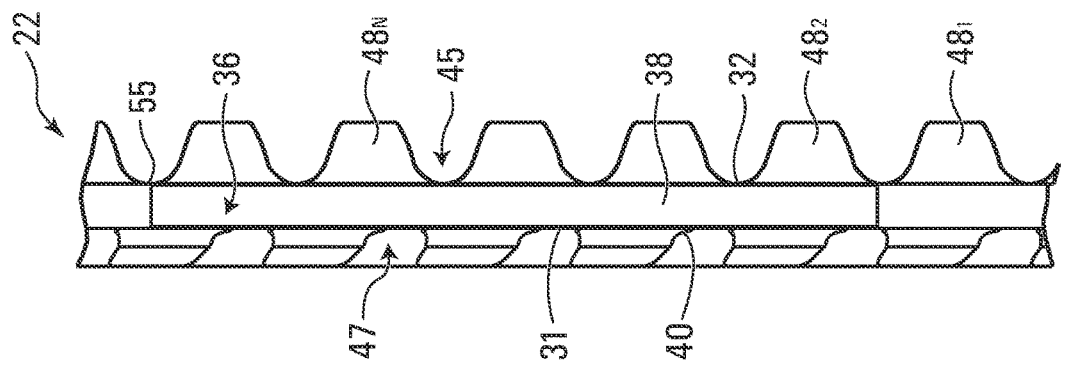
FIGS. 5 and 6 show a plan view and a side view of a track of the track system.
Figure 5:
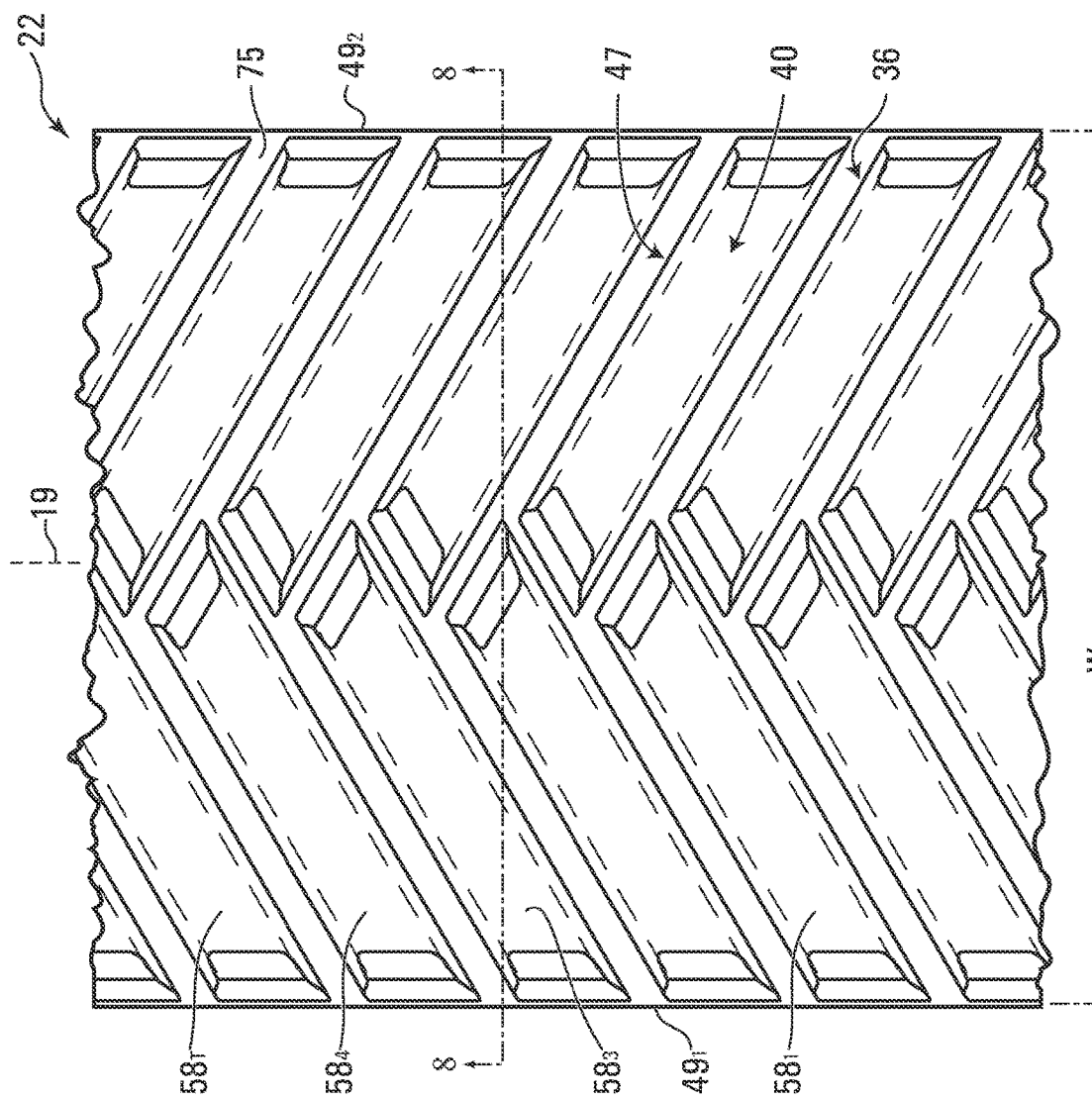
Figure 8:
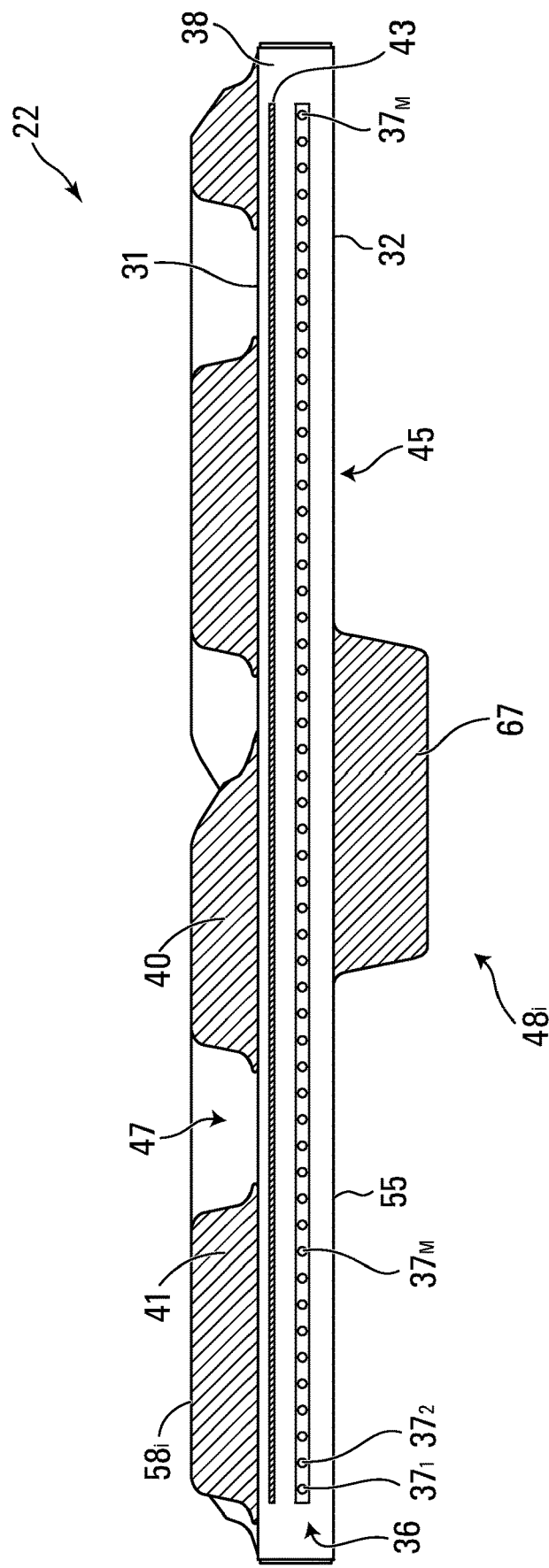
FIG. 8 shows a cross-sectional view of the track.

The track systems $16_1$, $16_2$ engage the ground to propel the agricultural vehicle 10. As shown in FIGS. 2 and 3, each track system $16_i$ is connected to the axle 56 of the agricultural vehicle 10 and comprises a track-engaging assembly 21 and a track 22 disposed around the track-engaging assembly 21. In this embodiment, the track-engaging assembly 21 comprises a plurality of wheels which, in this example, includes a drive wheel 24 and a plurality of idler wheels that includes front (i.e., leading) idler wheels $23_1$, $23_2$, rear (i.e., trailing) idler wheels $26_1$, $26_2$, and roller wheels $28_1$-$28_8$. The track system $16_i$ also comprises a frame 13 which supports various components of the track system $16_i$, including the idler wheels $23_1$, $23_2$, $26_1$, $26_2$, $28_1$-$28_8$. In addition, the track system $16_i$ comprises a transmission 78 between the axle 56 of the agricultural vehicle 10 and the drive wheel 24 to transmit power from the axle 56 to the drive wheel 24 and perform a speed conversion such that the drive wheel 24 rotates at a rotational speed different from a rotational speed of the axle 56.

The track system $16_i$ has a longitudinal direction and a first longitudinal end 57 and a second longitudinal end 59 that define a length of the track system $16_i$ along a longitudinal axis 61 that defines the longitudinal direction of the track system $16_i$. The track system $16_i$ has a widthwise direction and a width that is defined by a width W of the track 22. The track system $16_i$ also has a height direction that is normal to its longitudinal direction and its widthwise direction.

Each of the track systems $16_1$, $16_2$ may be steerable by the steering system 17 of the agricultural vehicle 10 in response to input of the user at the steering device to change an orientation of that track system relative to the frame 12 of the agricultural vehicle 10 in order to steer the agricultural vehicle 10 on the ground. To that end, each of the track systems $16_1$, $16_2$ may be pivotable about a steering axis of the agricultural vehicle 10. An orientation of the longitudinal axis 61 of each of the track systems $16_1$, $16_2$ may thus be adjustable relative to a longitudinal axis 97 of the agricultural vehicle 10.

Figure 12:
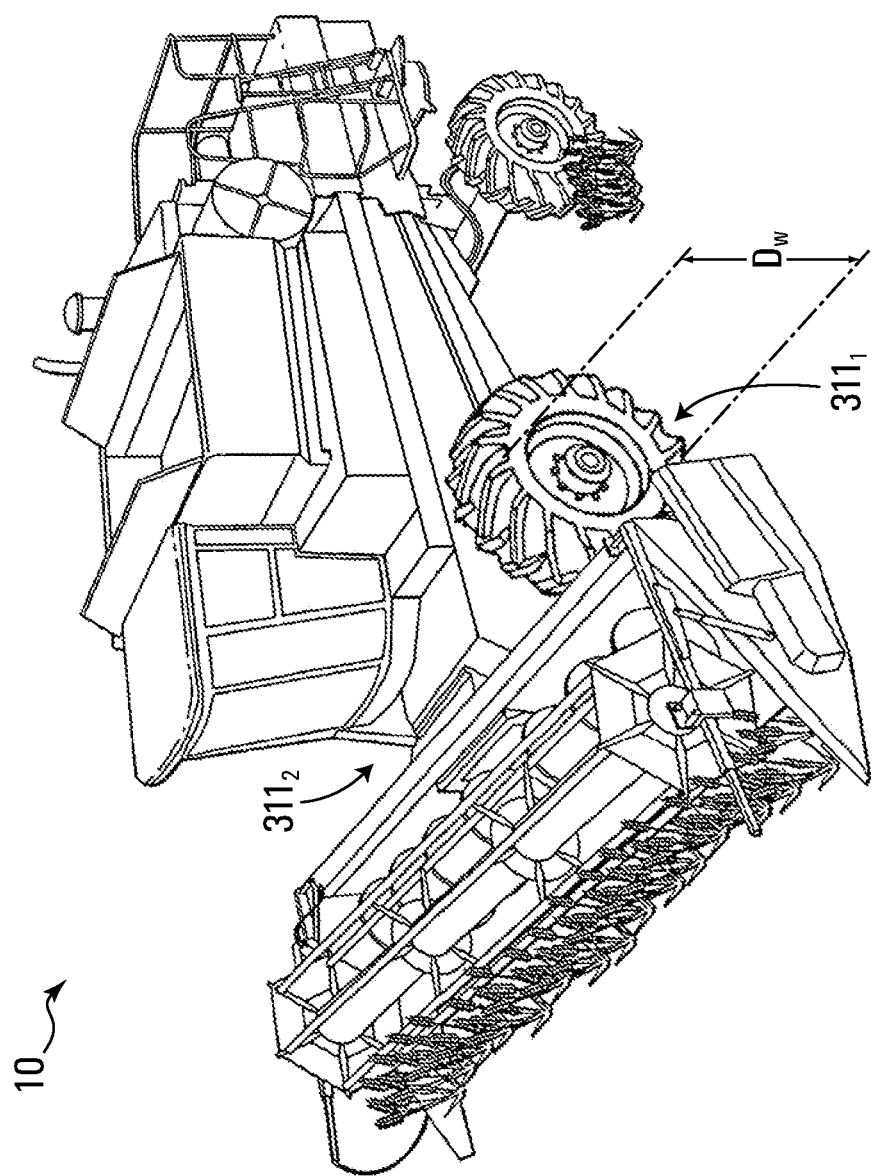
FIG. 12 shows the vehicle equipped with ground-engaging wheels to propel the vehicle on the ground.

In this embodiment, as shown in FIG. 12, the agricultural vehicle 10 may have been designed and manufactured as a wheeled vehicle propelled on the ground by ground-engaging wheels $311_2$, $311_2$ and the track systems $16_1$, $16_2$ may be mounted in place of respective ones of the ground-engaging wheels $311_1$, $311_2$ to convert the agricultural vehicle 10 from the wheeled vehicle into a tracked vehicle, thereby enhancing its traction and floatation on the ground. Each ground-engaging wheel $311_i$ is mounted to the axle 56 of the agricultural vehicle 10 and comprises a tire, which may be pneumatic or solid and made of rubber and/or other materials (e.g., agricultural or off-the-road (OTR) tires). In such embodiments, dimensions of each track system $16_i$ may allow it to be mounted in place of a ground-engaging wheel $311_i$ by removing the ground-engaging wheel $311_i$ and installing the track system $16_i$ in its place. In other embodiments, the agricultural vehicle 10 may have been designed and manufactured as a tracked vehicle with the track systems $16_1$, $16_2$ already provided thereon.

Figure 4:
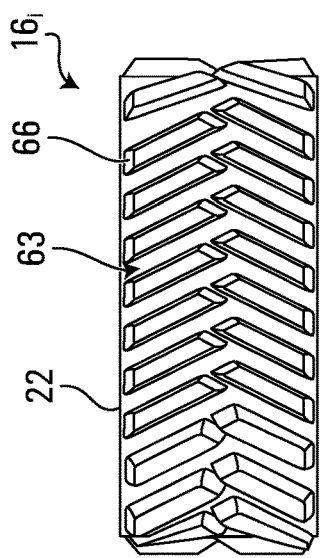
FIGS. 3 and 4 show a perspective view and a bottom view of one of the track systems.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 5 to 8, the track 22 comprises an inner side 45, a ground-engaging outer side 47, and lateral edges $49_1$, $49_2$. The inner side 45 faces the wheels $23_1$, $23_2$, 24, $26_1$, $26_2$, $28_1$-$28_8$, while the ground-engaging outer side 47 engages the ground. A top run 65 of the track 22 extends between the longitudinal ends 57, 59 of the track system $16_i$ and over the wheels $23_1$, $23_2$, 24, $26_1$, $26_2$, $28_1$-$28_8$, while a bottom run 66 of the track 22 extends between the longitudinal ends 57, 59 of the track system $16_i$ and under the wheels $23_1$, $23_2$, 24, $26_1$, $26_2$, $28_1$-$28_8$. As shown in FIG. 4, the bottom run 66 of the track 22 defines an area of contact 63 of the track 22 with the ground which generates traction and bears a majority of a load on the track system $16_i$, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_m$ that are adjacent to one another and extend generally in the longitudinal direction of the track 22 to enhance strength in tension of the track 22 along its longitudinal direction. In this case, each of the reinforcing cables $37_1$-$37_m$ is a cord including a plurality of strands (e.g., textile fibers or metallic wires). In other cases, each of the reinforcing cables $37_1$-$37_m$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_m$ and the layer of reinforcing fabric 43.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels $23_1$, $23_2$, 24, $26_1$, $26_2$, $28_1$-$28_8$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the front and rear idler wheels $23_1$, $23_2$, $26_1$, $26_2$ and/or the roller wheels $28_1$-$28_8$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheels $23_1$, $23_2$, $26_1$, $26_2$ and/or the roller wheels $28_1$-$28_8$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheels $23_1$, $23_2$, $26_1$, $26_2$ and the roller wheels $28_1$-$28_8$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle 56, which causes rotation of the drive wheel 24, which in turn imparts motion to the track 22.

In this embodiment, the drive wheel 24 comprises a drive sprocket comprising a plurality of drive members $52_1$-$52_B$ spaced apart along a circular path to engage the rive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

The idler wheels $23_1$, $23_2$, $26_1$, $26_2$, $28_1$-$28_8$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels $23_1$, $23_2$, $26_1$, $26_2$ maintain the track 22 in tension and help to support part of the weight of the agricultural vehicle 10 on the ground via the track 22. The roller wheels $28_1$-$28_8$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_8$ can be referred to as "mid-rollers".

Figure 9:
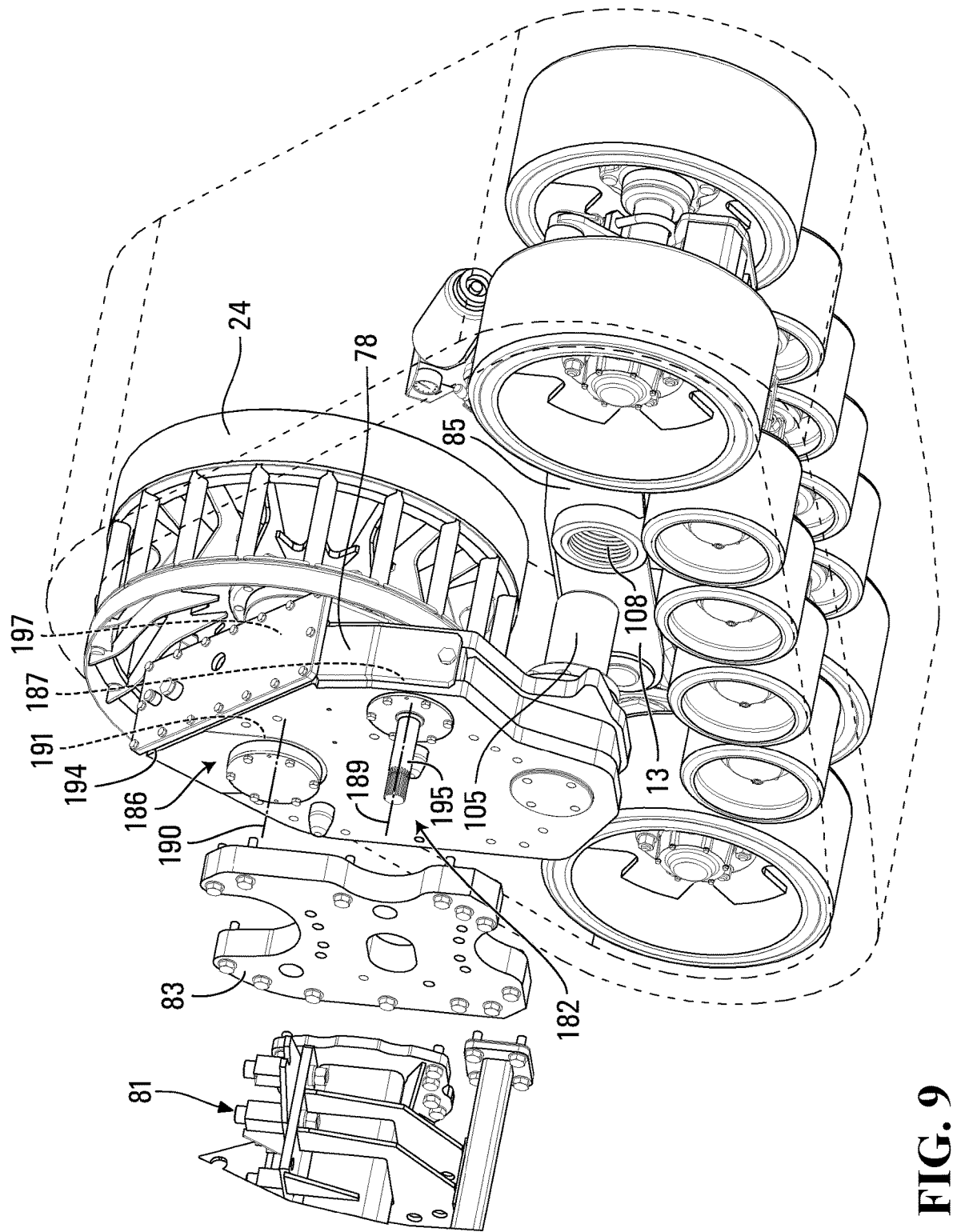
FIGS. 9 and 10 show partially exploded views of the track system including a connection between a transmission of the track system and the axle of the vehicle.
Figure 10:
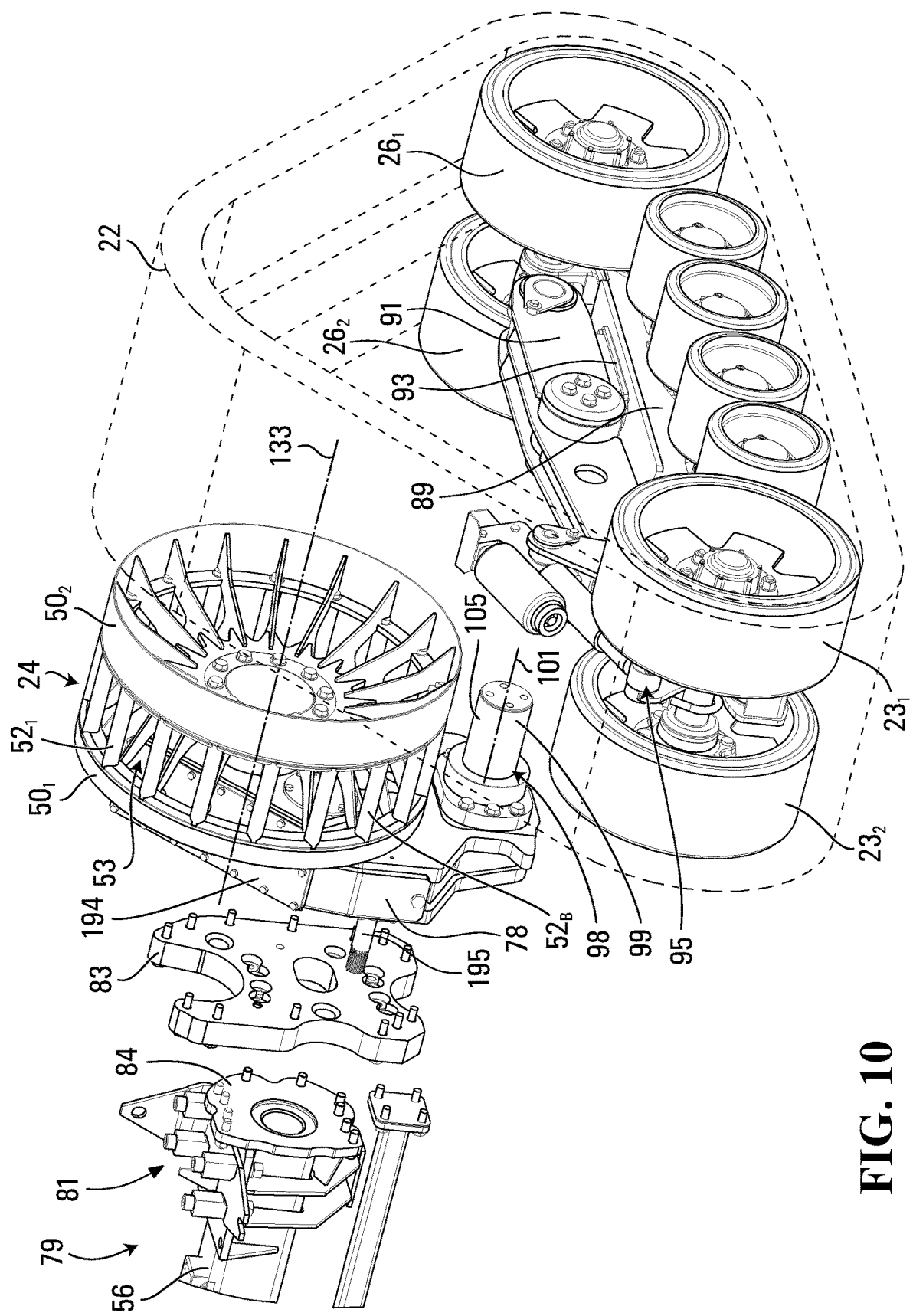

With additional reference to FIGS. 9 and 10, in this embodiment, the frame 13 of the track system $16_i$ comprises a wheel-carrying structure 85, which may be referred to as a "bogie", carrying the front and rear idler wheels $23_1$, $23_2$, $26_1$, $26_2$ and the mid-rollers $28_1$-$28_8$. More specifically, in this embodiment, the bogie 85 comprises a lower portion 89 carrying the mid-rollers $28_1$-$28_8$ and movable relative to an upper portion 91 connected to the transmission 78. A resilient member 93 is disposed between the lower portion 89 and the upper portion 91 of the bogie 85 and is resiliently deformable to allow movement of the lower portion 89 of the bogie 85 relative to the upper portion 91 of the bogie 85. This may help for shock absorption and/or ride quality. In this example, the resilient member 93 comprises an elastomeric spring (e.g., a polyurethane or rubber element). In other examples, the resilient member 93 may comprise a coil spring (e.g., a metallic or polymeric coil spring), a leaf spring, a gas spring (i.e., gas contained in a cylinder and variably compressed by a piston), or any other type of spring, i.e., any other type of resilient object that deforms under stress and recovers its original configuration when the stress is released. The lower and upper portions 89, 91 of the bogie 85 are thus interconnected via the resilient member 93 which allows them to move relative to one another. Thus, when the track system $16_i$ moves on the ground, the lower portion 89 of the bogie 85 may move relative to the upper portion 91 of the bogie 85, thereby causing deformation (i.e., compression or extension) of the resilient member 93. Upon release of the stress to which it is subjected, the resilient member 93 may recover its original configuration, biasing the lower and upper portions 89, 91 of the bogie 85 back to their respective original relative positions.

In this example of implementation, the track system $16_i$ comprises a tensioning mechanism 95 for tensioning the track 22. For instance, in this embodiment, the tensioning mechanism 95 comprises an actuator mounted at one end to the frame 13 of the track system $16_i$ and at another end to a hub of the front idler wheels $23_1$, $23_2$. This allows the tensioning mechanism 95 to modify a distance between the front idler wheels $23_1$, $23_2$ and the rear idler wheels $26_1$, $26_2$ in the longitudinal direction of the track system $16_i$.

The transmission 78 is mounted between the axle 56 of the agricultural vehicle 10 and the drive wheel 24 to transmit power from the axle 56 to the drive wheel 24 and perform the speed conversion such that the rotational speed of the drive wheel 24 is different from the rotational speed of the axle 56.

More particularly, in this embodiment, the transmission 78 comprises a first portion 182 connected to the axle 56 of the agricultural vehicle 10 and a second portion 186 connected to the drive wheel 24. The first portion 182 of the transmission 78 has an axis 189 defined by the axle 56, while the second portion 186 of the transmission 78 has an axis 190 generally coaxial with an axis of rotation 133 of the drive wheel 24. In this case, the axis 190 of the second portion 186 of the transmission 78 is spaced apart from the axis 189 of the first portion 182 of the transmission 78 in the longitudinal direction of the track system $16_i$ and in the height direction of the track system $16_i$. Thus, in this case, the axis of rotation 133 of the driver wheel 24 is spaced apart from the axis of rotation of the axle 56 in the longitudinal direction of the track system $16_i$ and in the height direction of the track system $16_i$. In other cases, the axis of rotation 133 of the drive wheel 24 may be aligned with the axis of rotation of the axle 56 in the longitudinal direction of the track system $16_i$ and/or in the height direction of the track system $16_i$.

Figure 11:
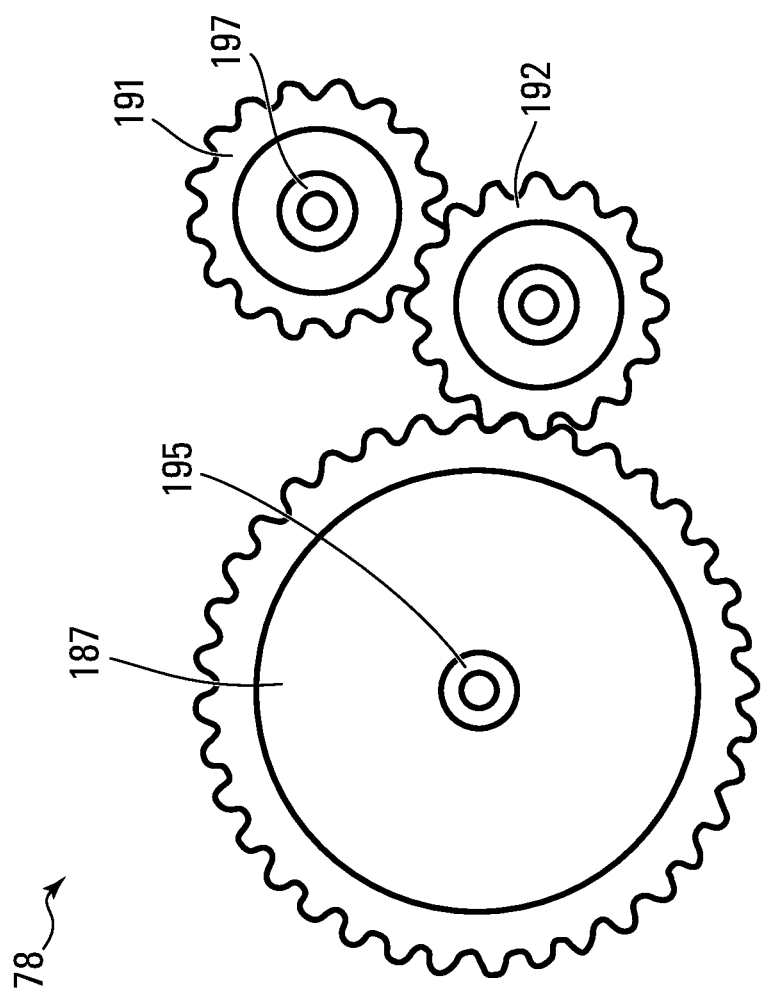
FIG. 11 shows an example of transmission wheels and a transmission member of the transmission of the track system.

In this embodiment, the first portion 182 of the transmission 78 comprises an input shaft 195 connectable to the axle 56 and leading to an input transmission wheel 187 and the second portion 186 of the transmission 78 comprises an output transmission wheel 191 leading to an output shaft 197 connected to the drive wheel 24. As shown in FIG. 11, in this example, the transmission wheels 187, 191 are interconnected by an intermediate transmission member 192. More particularly, in this embodiment, the transmission 78 comprises a gearbox, the first transmission wheel 187 is an input gear, the second transmission wheel is an output gear, and the intermediate transmission member 192 comprises an idler gear.

In this embodiment, the input gear 187 is larger than the output gear 191 such that the output gear 191 rotates faster than the input gear 187. In turn, this causes the drive wheel 24 to rotate faster than the axle 56 of the agricultural vehicle 10. A transmission ratio T can be selected so as to provide a desired speed conversion. The transmission ratio T can be expressed as a ratio $\omega_o/\omega_i$ of an output rotational speed $\omega_o$ of the transmission 78, which in this case is the rotational speed of the drive wheel 24, to an input rotational speed $\omega_i$ of the transmission 78, which in this case is the rotational speed of the axle 56 of the agricultural vehicle 10. For example, in some embodiments, the transmission ratio T of the transmission 78 may be at least 1.25, in some cases at least 1.50, in some cases at least 1.75, in some cases at least 2, in some cases at least 2.25, and in some cases even more (e.g., at least 2.75). The transmission ratio T may have any other suitable value in other embodiments.

In embodiments in which the track systems $16_1$, $16_2$ are used in place of ground-engaging wheels $311_1$, $311_2$ on which the agricultural vehicle 10 can be propelled on the ground, the transmission ratio T may be selected such that the speed of the agricultural vehicle 10 when equipped with the track systems $16_1$, $16_2$ corresponds or is as close as possible to the speed of the agricultural vehicle 10 when equipped with the ground-engaging wheels $311_1$, $311_2$. For instance, in some cases, the transmission ratio T may be selected on a basis of a diameter D of the drive wheel 24 and a diameter $D_w$ of a ground-engaging wheel $311_i$ specified for the agricultural vehicle 10.

In this embodiment, the track system $16_i$ is mounted to an axle structure 79 of the agricultural vehicle 10 by connecting the transmission 78 to the axle structure 79 of the vehicle 10. More particularly, in this embodiment, the axle structure 79 of the vehicle 10 includes the axle 56 and an axle member 81 (e.g., a beam, a housing, etc.) adjacent to the axle 56. The track system $16_i$ comprises a mounting member 83 (e.g., a mounting plate) that is securable to the axle member 81 of the vehicle 10. For instance, in this example, the mounting member 83 is fastenable (e.g., via bolts and/or other fasteners) to an end portion 84 of the axle member 81. The mounting member 83 may be configured based on a configuration of the axle member 81 of the vehicle 10 (e.g., different types of mounting members may be used for different models of vehicles). The transmission 78 is connected to the mounting member 83 such that the transmission 78 is supported and the input shaft 195 of the transmission 78 receives motion from the axle 56, which receives motion over the powertrain of the vehicle 10 (e.g., a motor drive assembly comprising a hydrostatic motor, gearbox and differential). In embodiments in which the track systems $16_1$, $16_2$ are used in place of ground-engaging wheels $311_1$, $311_2$ on which the agricultural vehicle 10 can be propelled on the ground, the axle 56 may thus remain unchanged in a switchover from the ground-engaging wheels $311_1$, $311_2$ to the track systems $16_1$, $16_2$.

The transmission 78 comprises a housing 194 (sometimes also referred to as a "casing") in which are housed components of the transmission 78. In this example, the housing 194 houses the gears 187, 191, 192.

In addition to its housing function, in this embodiment, the housing 194 of the transmission 78 also has a support function. More particularly, in this embodiment, the housing 194 of the transmission 78 supports the frame of the track system $16_i$ which supports the idler wheels $23_1$, $23_2$, $26_1$, $26_2$, $28_1$-$28_8$. The housing 194 of the transmission 78 is also used to secure the transmission 78 to the mounting member 83 that is connected to the axle structure 79 of the vehicle 10.

More particularly, in this embodiment, the track system $16_i$ comprises a connector 98 between the housing 194 of the transmission 78 and the bogie 85 carrying the idler wheels $23_1$, $23_2$, $26_1$, $26_2$, $28_1$-$28_8$ such that the bogie 85 carrying the idler wheels $23_1$, $23_2$, $26_1$, $26_2$, $28_1$-$28_8$ is movable relative to the housing 194 of the transmission 78. This may allow the bogie 85 carrying the idler wheels $23_1$, $23_2$, $26_1$, $26_2$, $28_1$-$28_8$ to better follow a contour of the ground. In this example, the connector 98 is disposed below the output shaft 197 of the transmission 78. The bogie 85 carrying the idler wheels $23_1$, $23_2$, $26_1$, $26_2$, $28_1$-$28_8$ thus depends, i.e., is suspended, from the housing 194 of the transmission 78.

In this embodiment, the connector 98 comprises a pivot 99 such that the bogie 85 carrying the idler wheels $123_1$, $123_2$, $126_1$, $126_2$, $128_1$-$128_8$ is pivotable relative to the housing 194 of the transmission 78. More particularly, in this embodiment, a pivot axis 101 of the pivot 99 is disposed below the output shaft 197 of the transmission 78 and substantially parallel to an axis of rotation of the output shaft 197 of the transmission 78. The transmission 78 thus supports the bogie 85 carrying the idler wheels $23_1$, $23_2$, $26_1$, $26_2$, $28_1$-$28_8$ such that the bogie 85 can pivot relative to the transmission 78 about the pivot axis 101, which does not coincide (i.e., is spaced apart from) the output shaft 197 of the transmission 78.

In this example of implementation, the pivot 99 comprises a pin 105 that extends from the housing 194 of the transmission 78 in the widthwise direction of the track system 16$_i$ and is received in an opening 108 of the bogie 85 carrying the idler wheels 23$_1$, 23$_2$, 26$_1$, 26$_2$, 28$_1$-28$_8$. The pivot 99 may be implemented in any other suitable way in other embodiments.

The transmission 78 may be implemented in any other suitable way in other embodiments. For example, in other embodiments, the intermediate transmission member 192 may be an endless transmission link disposed around the transmission wheels 187, 191 (e.g., each of the transmission wheels 187, 191 may be a sprocket gear and the transmission member 192 may be a transmission chain, each of the transmission wheels 187, 191 may be a pulley and the transmission member 192 may be a transmission belt, etc.). As another example, in other embodiments, the transmission 78 may comprise another arrangement of gears, a torque converter, and/or another transmission component, or may comprise another type of transmission (e.g., a continuously variable transmission (CVT), a hydrostatic or hydrodynamic transmission, an electric transmission, etc.). Also, while in some embodiments the transmission 78 may implement a single transmission ratio T, in other embodiments, the transmission 78 may implement a set of two or more available transmission ratios from which a particular transmission ratio is selected and applied at any point in time (e.g., an automatic transmission).

Although in embodiments considered above the track assemblies 16$_1$, 16$_2$ are provided in front of the agricultural vehicle 10 while the ground-engaging wheels 11$_1$, 11$_2$ are provided in its rear, in other embodiments, track assemblies such as the track assemblies 16$_1$, 16$_2$ may be provided in the rear or both in the front and the rear of the agricultural vehicle 10. In particular, in some embodiments, the agricultural vehicle 10 may be propelled only by track assemblies such as the track assemblies 16$_1$, 16$_2$ without any ground-engaging wheels.

Figure 13:
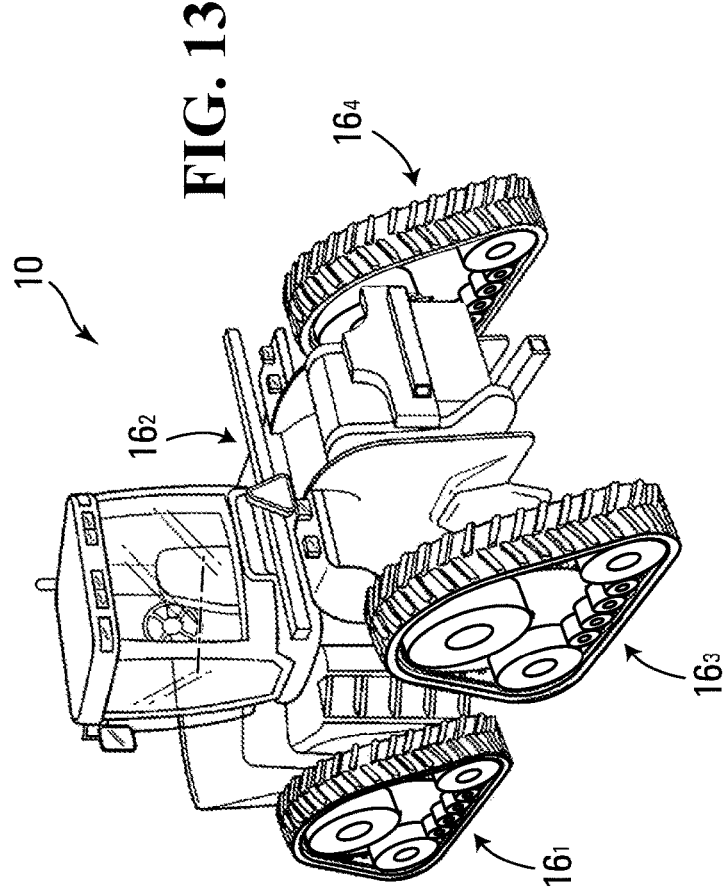
FIGS. 13 and 14 show an embodiment in which the vehicle is a tractor that can be equipped with four track systems in place of ground-engaging wheels.
Figure 14:
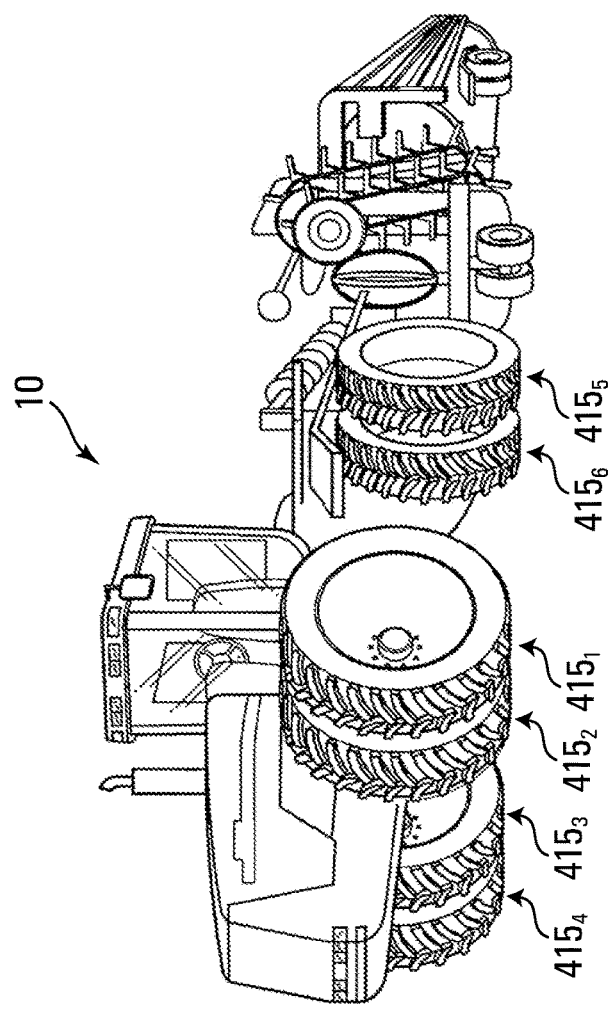

While in embodiments considered above the agricultural vehicle 10 is a combine harvester, the agricultural vehicle 10 may be another type of agricultural vehicle in other embodiments. For example, FIGS. 13 and 14 show an embodiment in which the agricultural vehicle 10 is a tractor. In this embodiment, the tractor 10 comprises a set of four track assemblies 16$_1$-16$_4$ like those discussed above. In this case, the track assemblies 16$_1$-16$_4$ are mounted in place of ground-engaging wheels 415$_1$-415$_8$ which could be mounted to the tractor 10 to propel it on the ground.

In other embodiments, the vehicle 10 may have a single track system on each lateral side. In such embodiments, this track system may be elongated in the longitudinal direction of the vehicle 10 such that it extends from the front to the rear of the vehicle 10 and may have a drive wheel located at longitudinal end of the track assembly (as opposed to between the front idler wheels 23$_1$, 23$_2$ and the rear idler wheels 26$_1$, 26 in the track assembly 16$_i$ discussed above) and an idler wheel at an opposite longitudinal end of the track system.

Although in embodiments considered above the vehicle 10 is an agricultural vehicle for performing agricultural work, in other embodiments, the vehicle 10 may be a construction vehicle (e.g., a loader, a bulldozer, an excavator, etc.) for performing construction work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, a transporter vehicle (e.g., a heavy hauler, a flatbed truck, a trailer, a carrier, etc.) for transporting equipment, materials, cargo or other objects, or any other vehicle operable off paved roads. Although operable off paved roads, the vehicle 10 may also be operable on paved roads in some cases. Also, while in embodiments considered above the vehicle 10 is driven by a human operator in the vehicle 10, in other embodiments, the vehicle 10 may be an unmanned ground vehicle (e.g., a teleoperated or autonomous unmanned ground vehicle).

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track system for traction of a vehicle, the track system being connectable to an axle of the vehicle, the track system comprising:
    a track; and
    a track-engaging assembly for driving and guiding the track around the track-engaging assembly, the track comprising elastomeric material to flex around the track-engaging assembly, the track-engaging assembly comprising:
    a drive wheel for driving the track;
    a plurality of track-contacting wheels for contacting a bottom run of the track, the track-contacting wheels including a leading idler wheel and a trailing idler wheel; and
    a transmission for transmitting power from the axle of the vehicle to the drive wheel such that a rotational speed of the drive wheel is different from a rotational speed of the axle of the vehicle;
    wherein axes of rotation of respective ones of the track-contacting wheels, including an axis of rotation of the leading idler wheel and an axis of rotation of the trailing idler wheel, are movable relative to the transmission.

2. The track system of claim 1, wherein the axes of rotation of the respective ones of the track-contacting wheels are pivotable relative to the transmission.

3. The track system of claim 1, wherein each of the axes of rotation of the respective ones of the track-contacting wheels is pivotable relative to the transmission about a pivot axis located within a span of the drive wheel in a longitudinal direction of the track system and intersecting the transmission.

4. The track system of claim 1, wherein: the track-contacting wheels include roller wheels disposed between the leading idler wheel and the trailing idler wheel in a longitudinal direction of the track system; and the axes of rotation of the respective ones of the track-contacting wheels include axes of rotation of the roller wheels.

5. The track system of claim 1, wherein an axis of rotation of the drive wheel is located between the axis of rotation of the leading idler wheel and the axis of rotation of the trailing idler wheel in a longitudinal direction of the track system.

6. The track system of claim 1, wherein the track-engaging assembly comprises: a frame carrying the track-contacting wheels; and a connector disposed between the transmission and the frame such that the frame is movable relative to the transmission.

7. The track system of claim 6, wherein the connector is connected to the frame where the connector overlaps with the transmission in a longitudinal direction of the track system.

8. The track system of claim 7, wherein the connector is connected to the frame where the connector overlaps with the transmission in a heightwise direction of the track system.

9. The track system of claim 6, wherein the connector comprises a pivot such that the frame is pivotable relative to the transmission.

10. The track system of claim 9, wherein the pivot is connected to the frame where the pivot overlaps with the transmission in a longitudinal direction of the track system.

11. The track system of claim 10, wherein the pivot is connected to the frame where the pivot overlaps with the transmission in a heightwise direction of the track system.

12. The track system of claim 6, wherein the frame is suspended from the transmission.

13. The track system of claim 6, wherein the transmission comprises an output shaft and the connector is disposed below the output shaft of the transmission in a heightwise direction of the track system.

14. The track system of claim 9, wherein the transmission comprises an output shaft and the pivot is spaced apart from the output shaft of the transmission.

15. The track system of claim 9, wherein the transmission comprises an output shaft and the pivot is below the output shaft of the transmission in a heightwise direction of the track system.

16. The track system of claim 9, wherein the pivot comprises a pin extending from the transmission and the frame comprises an opening receiving the pin.

17. The track system of claim 6, wherein the track-engaging assembly comprises a resilient member between portions of the frame to allow the portions of the frame to move relative to one another.

18. The track system of claim 17, wherein the resilient member comprises an elastomeric spring.

19. The track system of claim 17, wherein the resilient member comprises a coil spring.

20. The track system of claim 1, wherein the track system is configured to replace a ground-engaging wheel of the vehicle.

21. A vehicle comprising the track system of claim 1.

22. The vehicle of claim 21, wherein the vehicle is an agricultural vehicle.

23. A track system for traction of a vehicle, the track system being connectable to an axle of the vehicle, the track system comprising:
   a track; and
   a track-engaging assembly for driving and guiding the track around the track-engaging assembly, the track comprising elastomeric material to flex around the track-engaging assembly, the track-engaging assembly comprising:
   a drive wheel for driving the track;
   a plurality of track-contacting wheels for contacting a bottom run of the track; and
   a transmission for transmitting power from the axle of the vehicle to the drive wheel such that a rotational speed of the drive wheel is different from a rotational speed of the axle of the vehicle;
   wherein: axes of rotation of respective ones of the track-contacting wheels are pivotable relative to the transmission; and each of the axes of rotation of the respective ones of the track-contacting wheels is pivotable relative to the transmission about a pivot axis located within a span of the drive wheel in a longitudinal direction of the track system and intersecting the transmission.

24. The track system of claim 23, wherein: the track-contacting wheels include a leading idler wheel and a trailing idler wheel; and the axes of rotation of the respective ones of the track-contacting wheels include an axis of rotation of the leading idler wheel and an axis of rotation of the trailing idler wheel.

25. The track system of claim 24, wherein: the track-contacting wheels include roller wheels disposed between the leading idler wheel and the trailing idler wheel in a longitudinal direction of the track; and the axes of rotation of the respective ones of the track-contacting wheels include axes of rotation of the roller wheels.

26. The track system of claim 24, wherein an axis of rotation of the drive wheel is located between the axis of rotation of the leading idler wheel and the axis of rotation of the trailing idler wheel in a longitudinal direction of the track system.

27. The track system of claim 23, wherein the track-engaging assembly comprises: a frame carrying the track-contacting wheels; and a pivot disposed between the transmission and the frame such that the frame is pivotable relative to the transmission.

28. The track system of claim 27, wherein the pivot is connected to the frame where the pivot overlaps with the transmission in a longitudinal direction of the track system.

29. The track system of claim 28, wherein the pivot is connected to the frame where the pivot overlaps with the transmission in a heightwise direction of the track system.

30. The track system of claim 27, wherein the frame is suspended from the transmission.

31. The track system of claim 23, wherein the transmission comprises an output shaft and the pivot axis is below the output shaft of the transmission in a heightwise direction of the track system.

32. The track system of claim 27, wherein the pivot comprises a pin extending from the transmission and the frame comprises an opening receiving the pin.

33. The track system of claim 27, wherein the track-engaging assembly comprises a resilient member between portions of the frame to allow the portions of the frame to move relative to one another.

34. The track system of claim 33, wherein the resilient member comprises an elastomeric spring.

35. The track system of claim 33, wherein the resilient member comprises a coil spring.

36. The track system of claim 23, wherein the track system is configured to replace a ground-engaging wheel of the vehicle.

37. A vehicle comprising the track system of claim 23.

38. The vehicle of claim 37, wherein the vehicle is an agricultural vehicle.

39. A track system for traction of a vehicle, the track system being connectable to an axle of the vehicle, the track system comprising:
   a track; and a track-engaging assembly for driving and guiding the track around the track-engaging assembly, the track comprising elastomeric material to flex around the track-engaging assembly, the track-engaging assembly comprising:
a drive wheel for driving the track;
a plurality of track-contacting wheels for contacting a bottom run of the track, the track-contacting wheels including a leading idler wheel and a trailing idler wheel;
a frame carrying the track-contacting wheels;
a resilient member between portions of the frame to allow the portions of the frame to move relative to one another; and
a transmission for transmitting power from the axle of the vehicle to the drive wheel such that a rotational speed of the drive wheel is different from a rotational speed of the axle of the vehicle;
wherein: axes of rotation of respective ones of the track-contacting wheels, including an axis of rotation of the leading idler wheel and an axis of rotation of the trailing idler wheel, are pivotable relative to the transmission; and each of the axes of rotation of the respective ones of the track-contacting wheels is pivotable relative to the transmission about a pivot axis located within a span of the drive wheel in a longitudinal direction of the track system and intersecting the transmission.

* * * * *